Patented Feb. 13, 1934

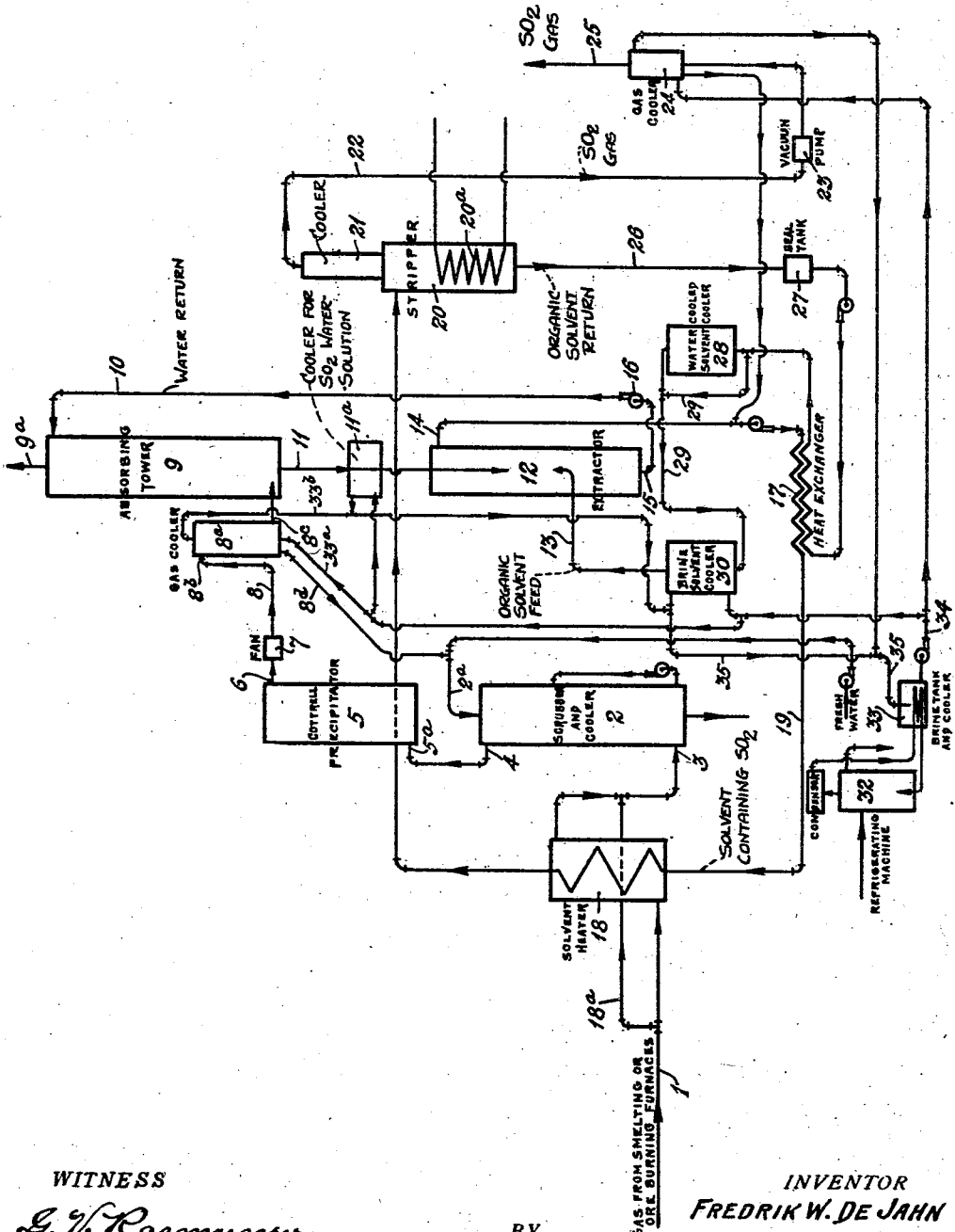

1,946,489

UNITED STATES PATENT OFFICE 1,946,489

METHOD FOR RECOVERING IN CONCENTRATED FORM GAS EXISTING IN DILUTE ADMIXTURE WITH OTHER GASES

Fredrik W. de Jahn, New York, N. Y., assignor to Jacob D. Jenssen, New York, N. Y.

Application May 17, 1932. Serial No. 611,818

12 Claims. (Cl. 23—180)

The present invention relates to the extraction or concentration of gases and vapors from mixtures containing the same and particularly from mixtures wherein the gas or vapor to be extracted is present in comparatively low concentration. The object of the invention is to provide means for economically recovering, as concentrated or substantially 100% gas, a gas component such as $SO_2$ from gas mixtures in which the gas to be recovered is present in relatively small proportions.

The improved method involves absorbing the component of the gas mixture to be concentrated in a suitable solvent such as, in the case of $SO_2$, a cold aqueous medium, then withdrawing the dissolved gas from such solvent by means of a second solvent which is immiscible with the first and has a selectively preferential solvent affinity for the gas, and finally expelling the gas from the second solvent and thereby recovering it as 100% gas. In this way I am enabled to provide an economical and continuous process by establishing two separate liquid circuits which meet at a point where the first solvent transfers its dissolved gas to the second, whereupon the first solvent is re-circulated to pick up additional quantities of gas while the second circuit passes through stages where the solvent yields up the gas on heating, the second solvent being then re-refrigerated and returned to contact with the first solvent.

The improved process also includes numerous other novel features which will be described in greater detail in later portions of this specification.

Although the process or certain features thereof may be advantageously utilized for the extraction and concentration of various kinds of soluble or slightly soluble gases under approximately similar conditions, the process has proved to be of special advantage in connection with the extraction of sulphur dioxide from gaseous products of combustion of various origins and the following description will be directed to the extraction of this gas from mixtures containing the same, such as smelter gases (or gases from sulphur or sulphur-bearing ores such as pyrites or zincblende or the like) wherein the proportion of $SO_2$ is relatively low.

Heretofore practically all processes aiming at recovery of substantially 100% $SO_2$ from smelter gases or the like have involved the use of water at normal temperatures for absorbing $SO_2$ from the gases followed by liberation of the dissolved $SO_2$ from the water by application of heat. The percentage of $SO_2$ dissolvable in water is so low that enormous quantities of water and of steam for heating the water were required. For example, it takes approximately 120 tons of water to recover one ton of $SO_2$ in this way. Even with the most efficient heat-exchange apparatus it will be obvious that the element of the cost of steam or heat will always be a substantial one. The plant and equipment are also necessarily elaborate and expensive.

I have found that $SO_2$ can be most efficiently and economically extracted from gas mixtures containing in the case of smelter gases say from 4% to 6% $SO_2$ (or in the case of pyrites gases 7%–10% and in other cases 14%–17%) by first bringing such mixtures in gas-absorbing relation with cold water of a temperature but little above 32° F. At this temperature the water is capable of absorbing practically the whole of the $SO_2$ content of the smelter gases or the like. The water holding the $SO_2$ in solution is then flowed into contact with and through an organic solvent having a greater absorptive affinity for $SO_2$ than water and also at a low temperature with the result that the water gives up $SO_2$ to the organic solvent and is simultaneously cooled or at least retains it relatively low temperature. The cooled water stripped of its $SO_2$ is then recirculated into contact with the gas mixture containing the $SO_2$. Meanwhile the organic solvent which has taken over $SO_2$ from the water solution is heated to expel the $SO_2$ which in this manner is collected as substantially 100% $SO_2$. The organic solvent, freed of $SO_2$, is then recooled and thereupon re-introduced into contact with water charged with $SO_2$ and thence again passes through the heating, cooling, and reintroduction cycles described. The water and the organic solvent, both continuously traveling through their own circuits, require practically no replenishment save for minor losses, so that instead of enormous consumption and waste of solvent fluid (water) of prior processes the same bodies of solvents are used over and over again.

In the new process the quantity of organic solvent is preferably considerably less than that of the water, approximating, for example, half of the water. As the organic solvents generally have a specific heat very much lower than that of water, the added advantage is obtained that the heat required for boiling off the $SO_2$ from the organic solvents is only about one-fourth or one-fifth of that which is required in processes which involve the necessity of heating an aqueous solution of $SO_2$ for the separation of the water and the $SO_2$. In the new process the necessity of continuously pumping enormous quantities of fresh water is obviated and it becomes economically possible to operate the absorption equipment at a lower temperature, say from 33° to 34° F. simply by cooling the water. The solubility of $SO_2$ in water increases rapidly with the lowering of the temperature. Thus at 33° F. the solvent capacity of water for $SO_2$ is almost twice what it was at 70° F. so that by operating at 33° F. only one-half of the amount of water is needed as compared with operating at 70° F. Operating the absorption plant at 33° F. also means that the plant as a whole will operate under the same conditions summer and winter with resultant uniformity of over-all procedure.

The organic solvent to be used should preferably have all of the following properties:

1. Substantially insoluble in water.
2. Of a different specific gravity from that of water.
3. Should be unaffected by the $SO_2$.
4. Should give up its absorbed $SO_2$ by the application of heat.
5. Should have a relatively high boiling point.
6. Should have a preferential affinity for $SO_2$ as compared with water.

The solvent may be an aromatic hydrocarbon compound or an aliphatic compound. It may contain an acid radical, an alcohol radical or a ketone radical. It may be a chlorinated or a nitro compound. Among the comopunds which have been tried successfully are amylacetate, nitro-benzol, nitro-toluol, mythyl-hexyl-ketone, methyl-amyl-ketone, dichlorethylether. Organic amino compounds may also be employed provided they have the property of forming an unstable compound with $SO_2$ which is insoluble in water.

Example 1

One hundred grams of a 1% solution of $SO_2$ in water was mixed with 45 grams of amylacetate, both at approximately 0° C, and after separating the liquids the water was found to contain .2 grams of $SO_2$. In other words, 80% of the $SO_2$ had been removed from the water by the amylacetate.

Example 2

One hundred grams of a 1% $SO_2$ solution in water was mixed with 43 grams of methyl-hexyl-ketone at room temperature and after separating the liquids the water was found to contain .12 grams of $SO_2$; that is, 88% of the $SO_2$ was removed from the water by the ketone.

Instead of employing water for absorbing the $SO_2$ from the gas, some other suitable solvent such as a water solution containing a soluble inorganic salt or inorganic acid may be employed. Potassium salts such as potassium chloride or potassium sulphate are particularly suitable, although other suitable salts may be employed. Addition to the water of for example 8% of salt such as potassium sulphate not only lowers the freezing point of the mixture but increases the solubility of $SO_2$ in the mixture about 10%, enabling the absorption of $SO_2$ to be carried out at still lower temperatures than 33° F. and with increased relative efficiency. By lowering the temperature of the water solution, a smaller quantity of solution is needed for absorbing the same quantity of $SO_2$ and that in turn reduces the amount of the second solvent needed for extraction of the $SO_2$ from the water solution.

The capacity of the second solvent for removing $SO_2$ from water increases more rapidly than proportionately with the lowering of temperatures. Thus when a hundred parts of a 1% solution of $SO_2$ solution in water is mixed with about fifty parts of amylacetate at 25° C., about 67% of the $SO_2$ will be extracted from the water, while at about 0° C. the percentage was found to be about 80%. Accordingly, by lowering the temperature of the water by the addition of suitable salts, the efficiency of the process in the step wherein the first solvent transfers its $SO_2$ to the second solvent, is increased.

The process may be carried out in the following manner in accordance with the diagram shown on the accompanying drawing which illustrates a satisfactory mode of practicing the invention.

The gas mixture is conducted by a pipe 1 from the smelting or ore-burning furnaces or other source of supply, and if hot, passes through a heat interchanger 18 as described below, after which the mixture enters the scrubbing tower 2 at 3 and leaves it at 4. The gases are here washed and cooled down to approximately atmospheric temperature by a cold water spray fed by pipe 2a. The cooled gases are then treated in a Cottrell precipitator 5, which they enter at 5a and leave at 6, and wherein any acid mist which may be present in the gases is removed. The gases now are sucked into a fan or ventilator 7 which forces them through a pipe 8 to a gas cooler 8a, which they enter at 8b and leave at 8c. In this cooler the gases are cooled by means of cold brine (circulating through lines 33a and 33b) to approximately the same temperature as the water which is admitted to the top of the absorption tower 9 to which the gases pass from the gas cooler 8a, while condensates draining through line 8d into line 2a are used for cooling the gases rising in the scrubber 2. The residual gases are discharged from the tower 9 into the atmosphere as indicated at 9a. Cold water (or water solution) is charged at the top of the absorption tower by a pipe 10 and the solution of $SO_2$ and water leaves the tower by a pipe 11.

The $SO_2$ solution is then passed (preferably through a plurality of spray nozzles capable of distributing the solution in fine enough division for effective control between the two liquids) into an extractor 12 where it meets a current of organic solvent admitted by pipe 13. On the way to the extractor 12 the $SO_2$ solution may be cooled to remove the heat of solution by passing through the cooler 11a. The solvent, which in the illustrated apparatus is one which is lighter than water, and immiscible therewith, rises to the top of the extractor carrying with it most of the $SO_2$ from the water solution, and leaves the extractor by a conduit 14; while the water substantially freed from $SO_2$ leaves the extractor by pipe 15 and is returned to the absorption tower by means of a pump 16. The water leaving the extractor is thus always maintained at the same low temperature.

The organic solvent leaving the extractor flows to a heat-exchanger 17 where it is heated by hot solvent as described below. The solvent then is further heated in the heater 18 to which it is conducted by a pipe 19, the heat being supplied by the hot gases on their way to the scrubber 2. If the gases are cold, this heat will have to be supplied by steam and the gases travel by by-pass 18a directly to the scrubber 2. The hot solvent from the heater 18 now enters a stripper 20 where it is subjected to a vacuum of at least 15 inches of mercury and the SO$_2$ gas contained in the solvent will be driven out. Steam is used in the coil 20a only when the temperature of the heated solvent is not high enough to liberate the SO$_2$. The expelled SO$_2$ gas is substantially completely freed from any solvent vapor in the cooler 21 on top of stripper 20. The SO$_2$ gas leaving the cooler by a pipe 22 enters a vacuum pump 23 which discharges it into another cooler 24 from which it is conducted by pipe 25 to suitable drying and liquefaction apparatus or to collecting or storage apparatus or to a point of use as in a case where it is desired to produce sulphuric acid or metallic sulphur by reduction with carbon. This cooler 24, which is kept at a temperature of from 10–15° F., removes any solvent vapor which may still be carried by the SO$_2$ gas. The solvent freed from the SO$_2$ gas leaves the stripper 20 through a barometric leg 26 and flows into a seal 27 from which it is pumped through the heat-exchanger 17 where it gives up part of its heat to the cold solvent from the extractor 12. In cases where very cold water is available the cooled solvent is passed through the water-cooled solvent cooler 28, but otherwise this is by-passed and the solvent passes through line 29 directly into the brine cooler 30 where it is further cooled. The solvent is cooled in the brine cooler 30 to a temperature sufficiently low to enable it to operate efficiently in the described process and generally to a temperature at least as low as the water solution entering the extractor 12. A refrigerating machine 32 is employed for cooling the brine used in the gas cooler 8a, in the water solution cooler 11a, in the solvent cooler 30, and in the SO$_2$ gas cooler 24, the cooled brine leaving the brine tank 33 by pipe 34 and after circulating through the four above mentioned apparatus elements returns to the brine cooler through collecting conduit 35.

From the above it will be clear that the water employed to extract the SO$_2$ from the gas mixture is not heated to practically the boiling point, as in prior processes, in order to expel the gas, but on the contrary, is always kept at a low temperature. It will also be evident that in view of the smaller quantity of organic solvent employed as compared with the quantity of water, and in view also of the much lower specific heat of such solvent, a very considerable saving in the amount of heat required to expel the SO$_2$ is effected by my improved process.

A further advantage of my process is that many parts of the apparatus may be built of wood and hence both built and maintained at a low cost.

I claim:

1. The method of extracting a soluble gas or vapor component from gaseous mixtures containing the same, which comprises absorbing such component in a first solvent, abstracting the dissolved component from such solvent with a second solvent which is immiscible with said first solvent, and then expelling the gaseous component from said second solvent.

2. The method of extracting a soluble gas or vapor component from gaseous mixtures containing the same, which comprises absorbing such component in a first solvent, abstracting the dissolved component from such solvent with a second solvent which is immiscible with said first solvent, then expelling the gaseous component from said second solvent, and re-using the gas-freed second solvent to absorb further quantities of gas from the first solvent.

3. The method of extracting a soluble gas or vapor component from gaseous mixtures containing the same, which comprises absorbing such component in the first solvent, abstracting the dissolved component from such solvent with a second solvent which is immiscible with said first solvent, then expelling the gaseous component from said second solvent, and re-using the first solvent to extract further quantities of the said component from the gas mixture.

4. The method of extracting a soluble gas or vapor component from gaseous mixtures containing the same, which comprises circulating continuously a body of solvent and abstracting said component from the gas mixture continuously with such solvent, circulating continuously a body of a second solvent which is immiscible with the first solvent, contacting the second solvent with the first solvent after the latter has been in gas-absorbing relation with the gas mixture, separating the two solvents, expelling the dissolved gas from the second solvent, and returning each of the two solvents to its own circuit.

5. The method of extracting a soluble gas or vapor component from gaseous mixtures containing the same, which comprises absorbing such component in a first solvent at a refrigerated temperature, abstracting the dissolved component from such solvent with a second refrigerated solvent which is immiscible with said first solvent, then expelling the gaseous component from said second solvent, re-using the first solvent at a refrigerated temperature to extract further quantities of the said component from the gas mixture, refrigerating the second solvent after the expulsion therefrom of the gaseous component, and passing it at refrigerated temperature into contact with further quantities of the first solvent containing the gaseous component in solution.

6. The method of extracting sulphur dioxide from gaseous mixtures containing the same, which comprises continuously circulating a body of water in gas-absorbing relation with the gas mixture, circulating a body of an organic solvent for sulphur dioxide which is immiscible with water, contacting the water after its absorption of sulphur dioxide with said organic solvent, separating the two solvents and returning each to its respective circuit, and expelling the sulphur dioxide from the organic solvent.

7. The method of extracting sulphur dioxide from gaseous mixtures containing the same, which comprises preparing a supply of a water solution containing a substance which causes the solution to have a lower freezing point than that of water, continuously circulating said solution at a refrigerated temperature in gas-absorbing relation with the gas mixture, circulating a body of an organic solvent for sulphur dioxide which is immiscible with water, and, during said circulation of the organic solvent, heating and then refrigerating the same and in the refrigerated state contacting the organic solvent with the water solution after its absorption of sulphur dioxide, separating the two solvents, and returning each to its respective circuit and then, in the organic solvent circuit, passing said solvent through its heating period and thereby expelling the sulphur dioxide from the organic solvent.

8. The method of extracting sulphur dioxide from gaseous mixtures containing the same, which comprises preparing a limited amount of an aqueous medium, continuously circulating said medium at a refrigerated temperature in gas-absorbing relation with the gas mixture, circulating a body of an organic solvent for sulphur dioxide which is immiscible with said aqueous medium, and, during said circulation of the organic solvent, heating and then refrigerating the same and in the refrigerated state contacting the organic solvent with the aqueous medium after its absorption of sulphur dioxide, separating the two solvents, and returning each to its respective circuit and then, in the organic solvent circuit, passing said solvent through its heating period and thereby expelling the sulphur dioxide from the organic solvent.

9. The method of extracting sulphur dioxide from gaseous mixtures containing the same, which comprises bringing the gas mixture in gas-absorbing relation with water, mixing the resultant solution with an organic solvent for sulphur dioxide which is immiscible with water, heating the organic solvent to expel the dissolved sulphur dioxide, cooling the organic solvent, and re-using the same to absorb further quantities of sulphur dioxide from the water solution thereof, and re-using the gas-freed water to extract further quantities of sulphur dioxide from the gas mixture.

10. The method as set forth in claim 9 wherein the water containing sulphur dioxide undergoes refrigeration prior to its mixture with the organic solvent.

11. The method as set forth in claim 9, including the step of bringing the gas containing organic solvent into heat-exchange relation with the incoming gas mixture when the latter is hot.

12. The method of extracting sulphur dioxide from gaseous mixtures containing the same, which comprises bringing the gas mixture in gas absorbing relation with water, mixing the resultant solution with an organic solvent for sulphur dioxide which is immiscible with water, heating the organic solvent to expel the dissolved sulphur dioxide, cooling the sulphur dioxide to precipitate the vapor of the organic solvent, cooling the organic solvent and re-using the same to absorb further quantities of sulphur dioxide from the water solution thereof, and re-using the gas-freed water to extract further quantities of sulphur dioxide from the gas mixture.

FREDRIK W. DE JAHN.